United States Patent [19]

Stoodley

[11] Patent Number: 5,320,163

[45] Date of Patent: Jun. 14, 1994

[54] PORTABLE, IMMERSIBLE HEAT EXCHANGER APPARATUS

[76] Inventor: John T. Stoodley, R.F.D. 1, Box 331A, Bellows Falls, Vt. 05101

[21] Appl. No.: 5,792

[22] Filed: Jan. 19, 1993

[51] Int. Cl.$^5$ ............................................. F28F 1/00
[52] U.S. Cl. ................................... 165/80.5; 165/75; 165/85; 165/132
[58] Field of Search ....................... 165/73, 74, 75, 85, 165/80.5, 132

[56] References Cited

U.S. PATENT DOCUMENTS 1,992,988  3/1935  Blahnik ................................. 165/85

FOREIGN PATENT DOCUMENTS 32441  10/1923  Denmark ............................... 165/74

Primary Examiner—Albert W. Davis, Jr.
Attorney, Agent, or Firm—S. Michael Bender

[57] ABSTRACT

A new and improved portable, immersible heat exchanger apparatus is provided for immersion into a quantity of material that is to cooled or heated. The apparatus includes a continuous copper tube assembly which is comprised of a straight, horizontal handle portion, a helically coiled immersion portion, and a vertically oriented, hook-shaped hanger portion. The top end of the immersion portion is connected to the handle portion; and the bottom end of the immersion portion is connected to the hanger portion. In use, the immersion portion is immersed in the material that is to undergo heat exchange. Tap water from a faucet is passed through the tube assembly to serve as a medium for heat exchange. The water enters the tube assembly at the handle portion, runs through the handle portion, the immersion portion, and the hanger portion, and exits from the end of the hanger portion. A flexible hose connects the handle portion to the water faucet. A first hose connector connects the flexible hose to the handle portion of the tube assembly, and a second hose connector connects the flexible hose to the water faucet. The portable, immersible heat exchanger apparatus may also include a movable thermometer support connected to the handle portion, and may also include a water-powered stirrer assembly, connected to the handle portion, for stirring the material.

8 Claims, 4 Drawing Sheets

PORTABLE, IMMERSIBLE HEAT EXCHANGER APPARATUS

BACKGROUND OF THE INVENTION

1. Field of the Invention

The present invention relates generally to heat exchangers and more particularly, to a portable, immersible heat exchanger apparatus especially adapted to effect cooling of material placed in a container.

2. Description of the Prior Art

Heat exchangers are well known in the art. Sometimes the heat exchanger is used for heating material. At other times the heat exchanger is used for cooling material.

In home brewing operations, a processing step requires cooling of a wort mixture. The wort mixture to be cooled can be located anywhere in the house. In this respect, it would be desirable to have a portable cooling apparatus that can readily be used at home for cooling wort anywhere in the house.

For convenience, it would be desirable to use tap water, such as from a garden hose or from a faucet in a sink or bathtub, to provide cooling water to cool the wort. In this respect, it would desirable if a portable cooling apparatus would be provided that can readily be carried to a source of tap water and readily connected to the source.

During the cooling operation, it would be desirable if temperature can be monitored so that when a desired temperature is obtained, the cooling operation can be stopped. In this respect, it would be desirable if a portable cooling apparatus would be provided with a mounting assembly for a thermometer.

Often, to improve efficiency in a cooling operation, it is desired that the material undergoing cooling is stirred as it is cooled. Stirrers are often driven by electric motors, and a potential electric shock hazard exists when water and electricity are both being used close together. In this respect, it would be desirable if a stirrer would be provided that is powered by the flow of the cooling water, rather than by electricity.

With respect to cooling apparatus, the following U.S. patents have been uncovered and may be of interest: U.S. Pat. Nos. 3,511,165 of Schwaiger; 4,633,678 of Lea et al; 4,802,344 of Livingston et al; 4,835,985 of Ilvento; and Des. 269,148 of Trkla et al. More specifically, Schwaiger discloses a complex evaporator and cooler used in the brewing industry. Lea et al disclose a keg cooler that uses a quantity of crushed ice as a cooling medium. Livingston et al disclose a thermally insulated jacket for enclosing a precooled keg of beverage. Ilvento discloses a sleeve for accommodating kegs that employs crushed ice as the cooling medium. Trkla et al disclose a design for a beer keg cooler.

Thus, while the foregoing body of prior art indicates it to be well known to use portable coolers, the provision of a more simple and cost effective device is not contemplated. Nor does the prior art described above teach or suggest a portable cooling apparatus that can readily be used at home for cooling wort anywhere in the house. Also, the prior art does not provide a portable cooling apparatus that can readily be carried to a source of tap water and can be readily connected to the source. The prior art does not provide a portable cooling device that includes a mounting assembly for a thermometer. In addition, the prior art does not provide a stirrer that is powered by the flow of cooling water, rather than by electricity. The foregoing disadvantages are overcome by the unique portable, immersible heat exchanger apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved portable, immersible heat exchanger apparatus for immersion into a quantity of material that is to cooled or heated. The apparatus includes a continuous copper tube assembly which is comprised of a straight, horizontal handle portion, a helically coiled immersion portion, and a vertically oriented, hook-shaped hanger portion. The first end, preferably the top end, of the immersion portion is connected to the handle portion. The hanger portion is connected to the second end, preferably the bottom end, of the immersion portion. The immersion portion is immersed in the material that is to undergo heat exchange. From a fluid source, a heat-exchange fluid, such as tap water, is passed through the tube assembly in order to serve as a medium for heat exchange. The water may enter the tube assembly at the handle portion, run through the handle portion, the immersion portion, and the hanger portion, and exit from the hanger portion. A flexible hose connects the handle portion to the source of fluid. A first hose connector connects the flexible hose to the handle portion of the tube assembly, and a second hose connector connects the flexible hose to the source of fluid, such as a water faucet or tap.

The portable, immersible heat exchanger apparatus may also include a movable thermometer support connected to the handle portion, for permitting temperature monitoring of the material undergoing heat exchange at different locations in the material. The portable, immersible heat exchanger apparatus may also include a fluid-powered stirrer assembly, connected to the handle portion, for stirring the material. The fluid-powered stirrer assembly includes a fluid-powered motor, a shaft connected to the motor, and a propeller, connected to the shaft. The fluid-powered motor is connected in-line with the handle portion and is powered by the tap water.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved portable, immersible heat exchanger apparatus which has all of the advantages of the prior art and none of the disadvantages.

It is another object of the present invention to provide a new and improved portable, immersible heat exchanger apparatus which may be easily and efficiently manufactured and marketed.

It is a further object of the present invention to provide a new and improved portable, immersible heat exchanger apparatus which is of durable and reliable construction.

An even further object of the present invention is to provide a new and improved portable, immersible heat exchanger apparatus which is susceptible of a low cost of manufacture with regard to both materials and labor, and which accordingly is then susceptible of low prices of sale to the consuming public, thereby making such portable, immersible heat exchanger apparatus available to the buying public.

Still yet a further object of the present invention is to provide a new and improved portable, immersible heat exchanger apparatus that can readily be used at home for cooling wort anywhere in the house.

Still another object of the present invention is to provide a new and improved portable, immersible heat exchanger apparatus that can readily be carried to a source of tap water and readily connected to the source.

Yet another object of the present invention is to provide a new and improved portable, immersible heat exchanger apparatus that includes a mounting assembly for a thermometer.

Even another object of the present invention is to provide a new and improved portable, immersible heat exchanger apparatus that includes a stirrer that is powered by the flow of cooling water, rather than by electricity.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS the invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved portable, immersible heat exchanger apparatus embodying the principles and concepts of the present invention will be described.

Figure 1:
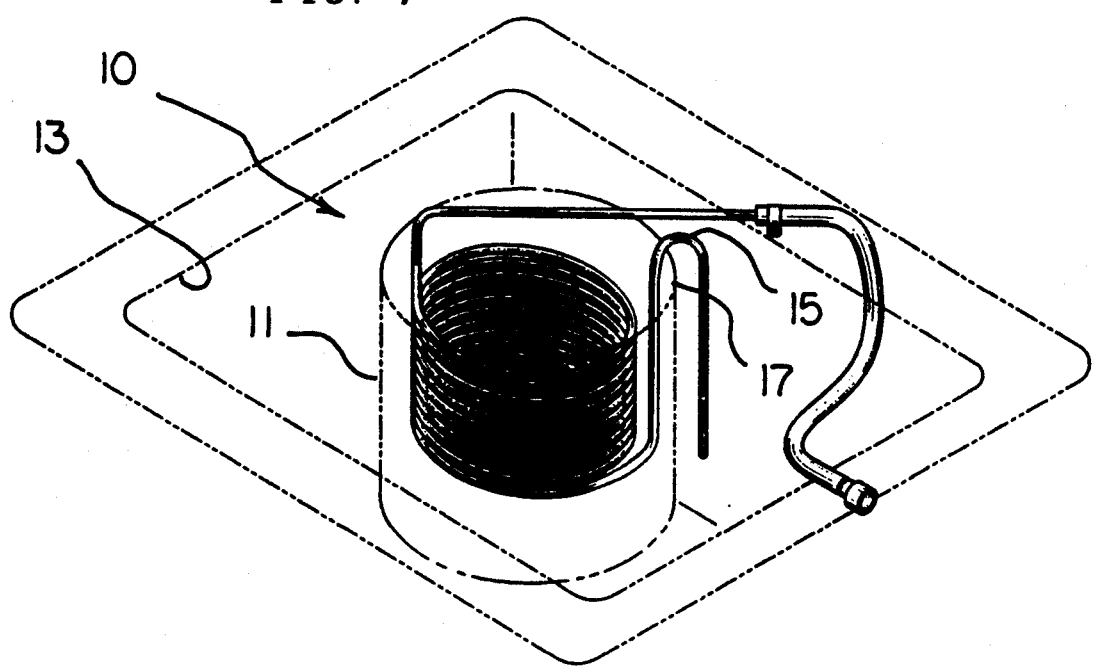
FIG. 1 is a perspective view showing a first preferred embodiment of the portable, immersible heat exchanger apparatus of the invention placed in a container which is resting in a sink.
Figure 2:
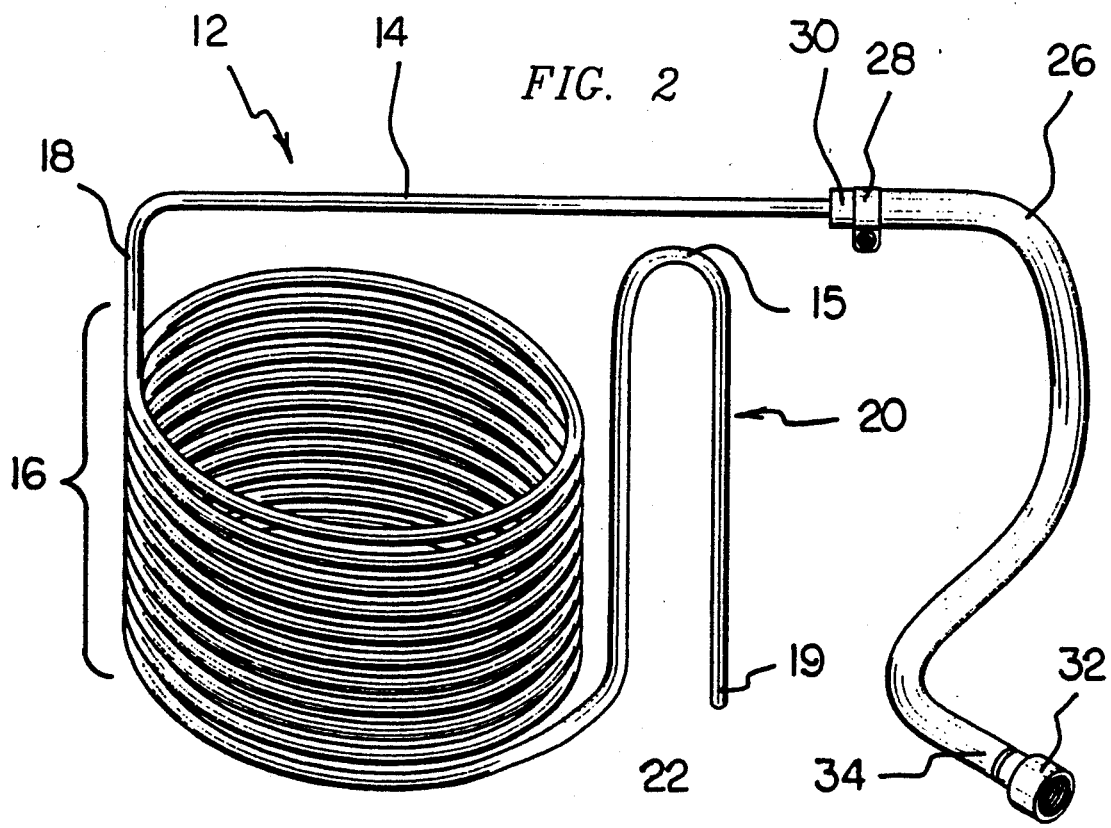
FIG. 2 is an enlarged perspective view of the embodiment of the portable, immersible heat exchanger apparatus shown in FIG. 1.

Turning initially to FIGS. 1 and 2, there is shown a first exemplary embodiment of the portable, immersible heat exchanger apparatus of the invention generally designated by reference numeral 10. As shown in FIG. 1 the portable, immersible heat exchanger apparatus 10 is inserted in a container 11 which is placed in sink 13. The container 11 may be a conventional metal or plastic bucket. Material to be cooled such as wort (not shown) or any other desired material would be placed in the container 11. To cool the material, the portable, immersible heat exchanger apparatus 10 of the invention would be connected to the cold water faucet (not shown). Alternatively, to heat the material, the portable, immersible heat exchanger apparatus 10 would be connected to the hot water faucet (not shown).

The portable, immersible heat exchanger apparatus 10 includes a continuous copper tube assembly 12 which includes a straight, horizontal handle portion 14, a helically coiled immersion portion 16, and a vertically oriented, hook-shaped or U-shaped hanger portion 20. The top end 18 of the immersion portion 16 is connected to the handle portion 14; and the hanger portion 20 is connected to the bottom end 22 of the immersion portion 16. The straight, horizontal handle portion 14 is connected to a top end of a far side of the helical, coiled portion 14 diametrically opposite the hanger portion 20. The handle portion 14 diametrically traverses over the helical, coiled portion toward the hanger portion 20, such that a portion of the handle portion 14 is positioned adjacent to a top portion of the hanger portion 20.

In use, the immersion portion 16 is immersed in the material to undergo heat exchange, and a heat-exchange fluid, such as tap water, is passed through the tube assembly 16 in order to provide heat exchange with the material undergoing heat exchange. The immersion portion 16 is usually immersed in a container 11, and the arch-shaped top portion 15 of the hanger portion 20 rests on and hangs from the upper rim 17 of the container 11. The straight handle portion 14 can be used to carry the portable, immersible heat exchanger apparatus of the invention from one location to another.

Means are provided for connecting the tube assembly 12 to a source of heat exchange fluid. More specifically, a flexible hose 26 and a first hose connector 28 are employed for connecting a first end 30 of the flexible hose 26 to the tube assembly 12. The first hose clamp can take the form of a screw clamp 28. A second hose connector 32 is used for connecting a second end 34 of the flexible hose 26 to a source of heat exchange fluid, such as a water faucet.

In operation, water exits a faucet, enters the flexible hose 26, enters the handle portion 14, enters the immersion portion 16, enters the hanger portion 20, and exits from the end 19 of the hanger portion 20. In a sink 13, the exiting water can then go down the sink drain.

Generally, the only portion of the portable, immersible heat exchanger apparatus 10 of the invention that is immersed in the material undergoing heat exchange is the immersion portion 16. In this respect, when the immersion portion 16 is to be cleaned or sterilized, the handle portion 14 can be grasped, and the immersion portion 16 can be lowered into a cleaning solution or boiling water. Alternatively, the entire tube assembly 12 of the invention can be placed in an automatic dishwasher.

Figure 3:
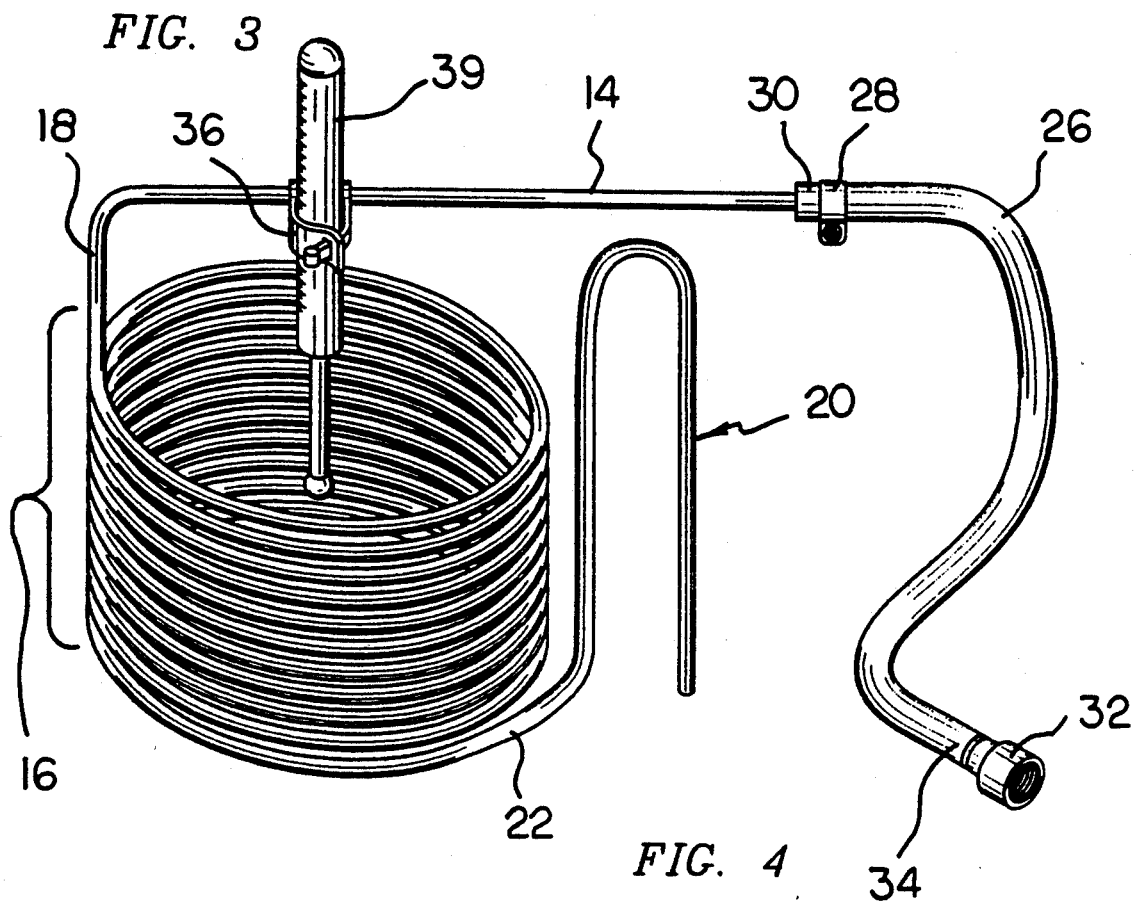
FIG. 3 is a perspective view of a second embodiment of the portable, immersible heat exchanger apparatus wherein a thermometer and its accompanying mounting are shown.
Figure 4:
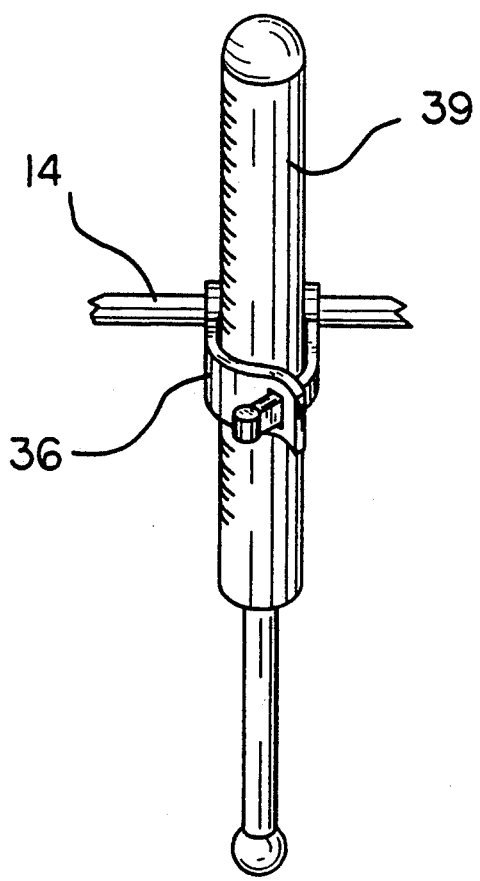
FIG. 4 is an enlarged perspective view of the thermometer and the accompanying mounting shown in FIG. 3.
Figure 5:
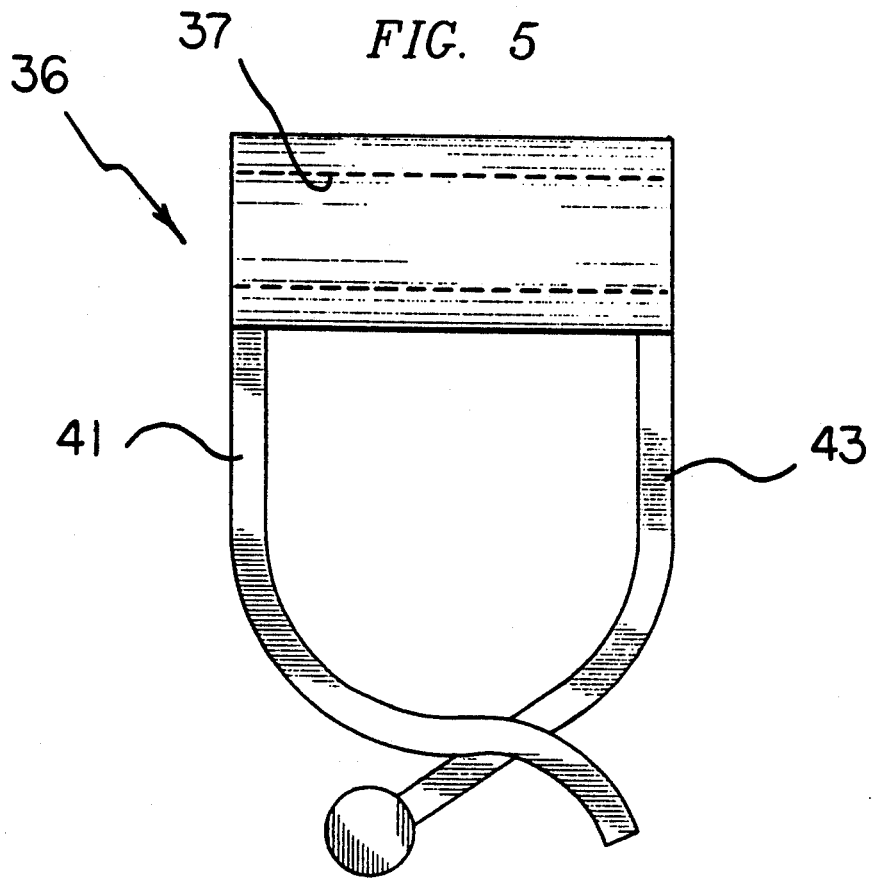
FIG. 5 is an enlarged top view of the thermometer mounting apparatus used in FIGS. 3 and 4.

Turning to FIGS. 3-5, a second embodiment of the portable, immersible heat exchanger apparatus 10 of the invention is shown. Reference numerals are shown that correspond to like reference numerals that designate like elements shown in the other figures. In addition, in FIGS. 3-5, a movable thermometer support assembly 36 is shown connected to the handle portion 14. More specifically, the thermometer support assembly 36 includes a hollow channel portion 37 that receives the handle portion 14. The support assembly 36 can be moved anywhere along the handle portion 14 to permit the temperature of the material to be monitored by the thermometer 39 at different locations in the material undergoing heat exchange. the support assembly 36 also includes flexible, lockable arms 41 and 43 for securing the thermometer 39 to the support assembly 36. The arms 41 and 43 are part of a squeeze clamp that secures the thermometer 39 to the handle portion 14.

Figure 6:
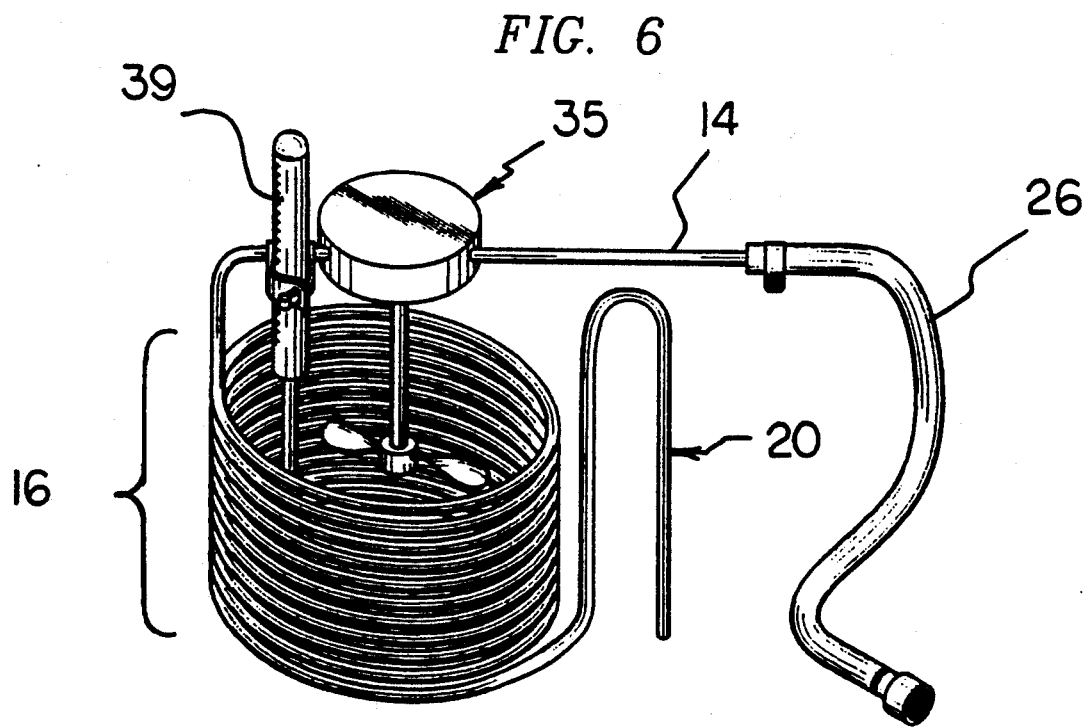
FIG. 6 is a perspective view of a third embodiment of the portable, immersible heat exchanger apparatus of the invention which includes a water-powered stirrer.
Figures 7, 8:
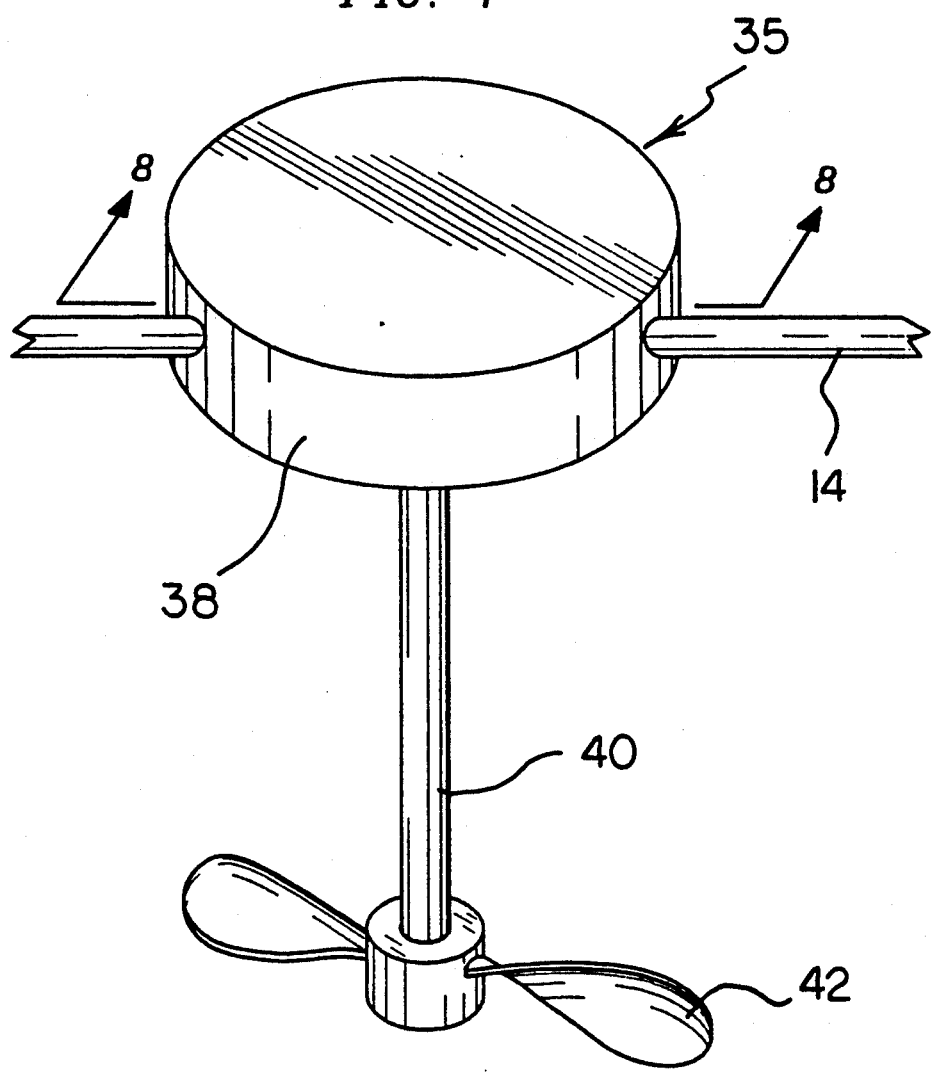
FIG. 7 is an enlarged perspective view of the stirrer shown in FIG. 6.
FIG. 8 is a cross-sectional view of the stirrer motor shown in FIG. 7 taken along the line 8—8 thereof.

Turning to FIGS. 6-8, a third embodiment of the portable, immersible heat exchanger apparatus 10 of the invention is shown. Reference numerals are shown that correspond to like reference numerals that designate like elements shown in the other figures. In addition, a fluid-powered stirrer assembly 35 is connected to the handle portion 14, in-line with the water flow path through the handle portion 14, for stirring the material undergoing heat exchange. The fluid-powered stirrer assembly 35 includes a fluid-powered motor 38, a shaft 40 connected to the motor 38, and a propeller 42, connected to the shaft 40. The motor 38 includes turbine blades 45 connected to the shaft 40. As water flowing through the handle portion 14 impacts the turbine blades 45, the shaft 40 is caused to rotate, whereby the propeller 42 rotates.

Although the embodiments described above disclose the use of a faucet for supplying heat-exchanging water to the portable, immersible heat exchanger apparatus 10 of the invention, other sources of water may be employed such as a garden hose. Although a screw connector 32 is shown for connecting the flexible hose 26 to a faucet, a suitable snap-action adapter could also be used.

A specific embodiment of the invention has been constructed using ⅜ inch copper tubing. An immersion coil has been made using 25 feet of the tubing formed into a helix. The total height of this embodiment is approximately 15 inches high. It is contemplated that coils having either an 8 inch or 10 inch diameter would be especially useful for the environment of a sink. It is noted that the entire tube assembly 12 shown in FIG. 1 is made from a single, continuous length of copper tubing. As an alternative, if desired, the tube assembly 12 can be made from plastic material, especially plastic material that is temperature resistant in the specific range for which the portable, immersible heat exchanger apparatus of the invention is to be employed. Alternatively, if desired, the individual elements of the tube assembly 12 can be made from separate components that are connected together in ways that are conventional for attaching pieces of tubing to one another. Such conventional connecting means include pipe couplings.

Other heat-exchange fluids besides water can be used. If desired for cooling below the freezing point of water, a mixture of ethylene glycol and water can be used. For heating near the boiling point of water, steam can be used as the heat-exchange fluid.

As an alternative embodiment to the embodiment shown in FIG. 1, the handle portion 14 may be connected a bottom end of an immersion portion 16, and the hanger portion 20 may be connected to a top end of the immersion portion 16.

The portable, immersible heat exchanger apparatus 10 of the invention is especially useful in cooling wort in a brewing process. More specifically, it has been discovered that approximately 6½ gallons of wort initially at 140 degrees F. can be cooled down to 60 degrees F. in approximately 15 minutes with 40 degree F. tap water.

It is apparent from the above that the present invention accomplishes all of the objects set forth by providing a new and improved portable, immersible heat exchanger apparatus that is low in cost, relatively simple in design and operation, and which may advantageously be in a sink in a home environment.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadcast interpretation of the appended claims so as to encompass all such modifications and equivalents.

What is claimed as new and desired to be protected by Letters Patent of the United States is as follows:

1. A new and improved portable, immersible heat exchanger apparatus for immersion into a quantity of material to undergo heat exchange, said apparatus comprising:
   a tube assembly comprised of,
      a handle portion,
      an immersion portion wherein a first end of said immersion portion is connected to said handle portion, and
      a hanger portion which is connected to a second end of said immersion portion,
   wherein said immersion portion is immersed in the material to undergo heat exchange,
   wherein a heat-exchange fluid is passed through said tube assembly in order to provide heat exchange with the material to undergo heat exchange,
   wherein said immersion portion is a helical, coiled portion and is oriented vertically,
   wherein said hanger portion is oriented vertically, is hook shaped, and is connected to a bottom end of a near side of said helical, coiled portion, and
   wherein said handle portion is oriented horizontally, is straight, is connected to a top end of a far side of said helical, coiled portion diametrically opposite said hanger portion, and wherein said handle portion diametrically traverses over said helical, coiled portion toward said hanger portion, such that a portion of said handle portion is positioned adjacent to a top portion of said hanger portion.

2. The apparatus described in claim 1 wherein the heat-exchange fluid is water.

3. The apparatus described in claim 1 wherein said tube assembly is a continuous tube.

4. The apparatus described in claim 1 wherein said tube assembly is comprised of a continuous copper tube.

5. The apparatus described in claim 1, further comprising:
   means for connecting said tube assembly to a source of heat exchange fluid.

6. The apparatus described in claim 5 wherein said source connecting means includes a flexible hose, a first hose connector for connecting a first end of said flexible hose to said tube assembly, and a second hose connector for connecting a second end of said flexible hose to a source of heat exchange fluid.

7. The apparatus described in claim 6 wherein said first hose connector is a screw clamp.

8. The apparatus described in claim 6 wherein said second hose connector is adapted to connect to a faucet.

* * * * *